United States Patent
Meskers

(10) Patent No.: US 11,365,989 B2
(45) Date of Patent: Jun. 21, 2022

(54) METHOD AND SYSTEM FOR CONTACTLESS DETECTION OF ROTATIONAL MOVEMENT

(71) Applicant: Nederlandse Organisatie voor toegepast-natuurwetenschappelijk onderzoek TNO, 's-Gravenhage (NL)

(72) Inventor: Adrianus Johannes Hendricus Meskers, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 399 days.

(21) Appl. No.: 16/618,307

(22) PCT Filed: May 29, 2018

(86) PCT No.: PCT/NL2018/050348
§ 371 (c)(1),
(2) Date: Nov. 29, 2019

(87) PCT Pub. No.: WO2018/222032
PCT Pub. Date: Dec. 6, 2018

(65) Prior Publication Data
US 2021/0156718 A1   May 27, 2021

(30) Foreign Application Priority Data

May 29, 2017  (EP) .................... 17173223

(51) Int. Cl.
  *G01D 5/26* (2006.01)
  *G01D 5/28* (2006.01)
  *G01D 5/34* (2006.01)
(52) U.S. Cl.
  CPC ............. *G01D 5/266* (2013.01); *G01D 5/285* (2013.01); *G01D 5/344* (2013.01)

(58) Field of Classification Search
  CPC .......... G01D 5/266; G01D 5/285; G01D 5/344
  See application file for complete search history.

(56) References Cited

U.S. PATENT DOCUMENTS

| | | | |
|---|---|---|---|
| 2004/0119982 A1* | 6/2004 | Matsumoto | A61B 5/14558 356/487 |
| 2007/0223005 A1 | 9/2007 | Lee | |
| 2012/0194824 A1 | 8/2012 | De Groot | |

FOREIGN PATENT DOCUMENTS

| | | |
|---|---|---|
| GB | 2391935 A | 2/2004 |
| JP | H04-155260 A | 5/1992 |

OTHER PUBLICATIONS

European Patent Office, International Search Report in corresponding International Application No. PCT/NL2018/050348, dated Aug. 9, 2018 (2 pages).

(Continued)

*Primary Examiner* — Thanh Luu
(74) *Attorney, Agent, or Firm* — Leydig, Voit & Mayer, Ltd.

(57) ABSTRACT

The invention pertains to a contactless measurement method for detecting rotation of an object over an axis coinciding with an optical axis of a probe beam. The probe beam is comprised of two monochromatic wavelengths with circular polarizations of opposite chirality, having a frequency difference for providing a heterodyne probe beam. A neutral beam splitter is provided that directs a reflected beam via a polarizer filter towards a first photodetector and that directs a transmitted beam toward a quarter wave plate attached to a rotatable object. A mirror reflects the probe beam, via the same quarter wave plate, back into the neutral beam splitter, which directs the reflected beam via a polarizer filter toward a second photodetector. The rotation is derived from the relative phase difference between the first and second photodetector signals.

8 Claims, 1 Drawing Sheet

(56) References Cited

OTHER PUBLICATIONS

V. Bagini et al., "Change of Energy of Photons Passing Through Rotating Anisotropic Elements," Eur. J. Phys., 15, pp. 71-78 (1994).
Bruce A. Garetz et al., "Variable Frequency Shifting of Circularly Polarized Laser Radiation Via a Rotating Half-Wave Retardation Plate," Optics Communications, vol. 31, No. 1, pp. 1-3 (Oct. 1979).
Gary E. Sommargren, "Up-down Frequency Shifter for Optical Heterodyne Interferometry," Journal of the Optical Society of America, vol. 65, No. 8, pp. 960-961 (Aug. 1975).

* cited by examiner

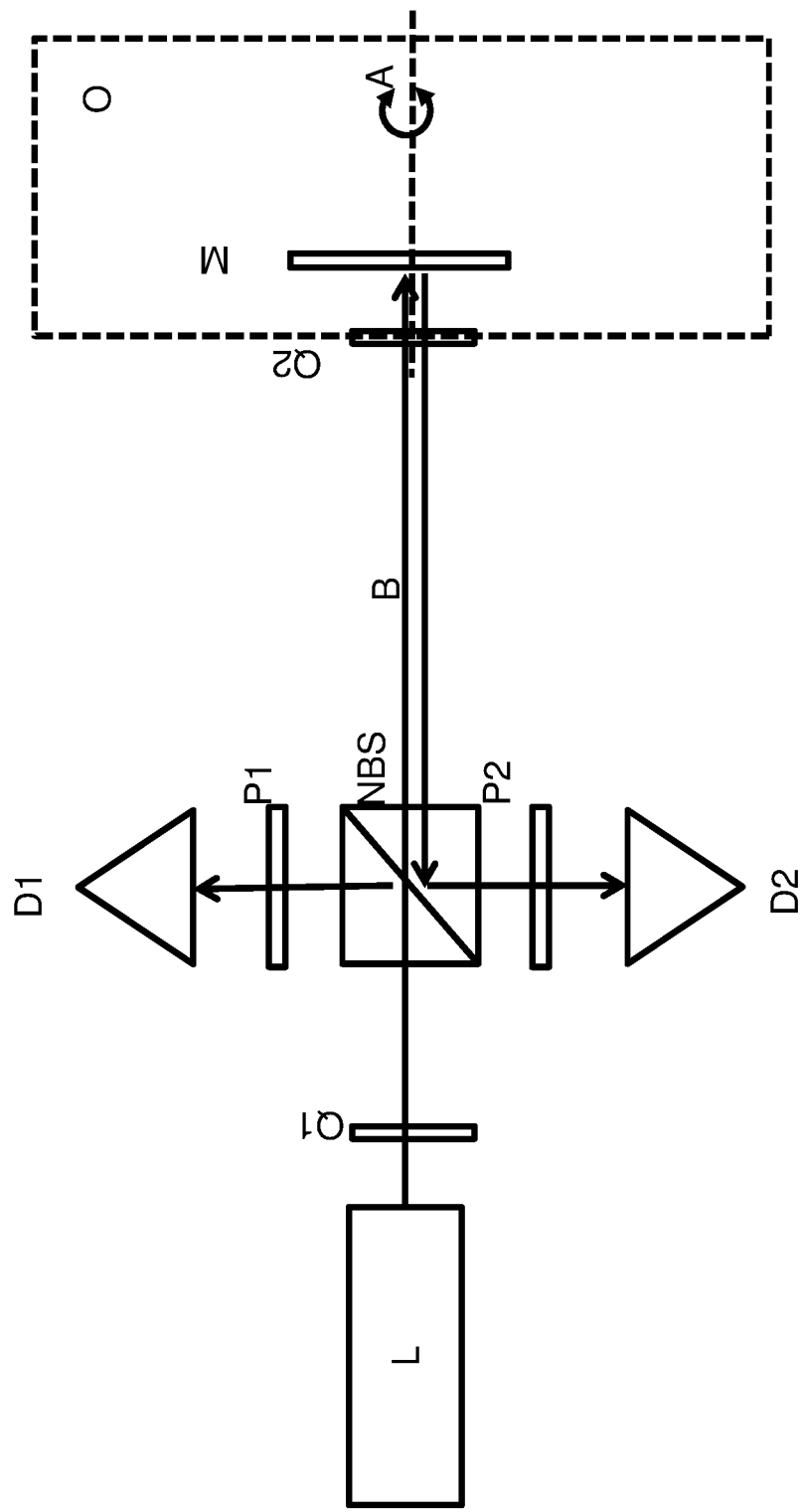

METHOD AND SYSTEM FOR CONTACTLESS DETECTION OF ROTATIONAL MOVEMENT

CROSS-REFERENCE TO RELATED APPLICATIONS

This patent application is a U.S. National Phase of PCT International Application No. PCT/NL2018/050348, filed May 29, 2018, which claims priority to European Application No. 17173223.3, filed May 29, 2017, which are both expressly incorporated by reference in their entireties, including any references contained therein.

FIELD OF THE INVENTION

The invention relates to a method and system to detect rotational movement.

BACKGROUND OF THE INVENTION

In carrying out precision measurements it is well known to use optical interferometry for detecting an optical path difference between a reference beam and a test beam. A phase shift between the test beam and the reference beam leads to fringes, which can be counted, due to the principle of optical wave interference. In a further enhancement, heterodyne interferometry utilizes a dual set of frequencies, amounting to differential frequencies that can be used to further improve measurement accuracy.

While in linear systems, these detection methods are well advanced, to measure a rotation, the conventional way is to measure a tangential movement in a linear fashion by means of using two linear displacement measurements spatially separated. This has as a disadvantage, that for moving systems, rotational and linear movements will be coupled, so that, when trying to measure a rotation, linear displacement of the object will influence the measurement. This rotation also causes 'beam walkoff' on the detectors, which limits the maximum measurable angular rotation as a function of object distance and also induces measurement error during upon non-flat optical wave-fronts. JPH0404155260A describes a rotational speed measuring apparatus that detects the rotational speed of a rotor from the current intensity of a photoelectric detector. The apparatus uses reflected polarized lights impinged a quarter wavelength plate mounted on a rotor, to measure rotation speed by direct measurement of intensity variations.

The present invention is about an interferometric measurement system, that directly measures the rotation with improved resolution, without reference to the linear displacement of the tangent, it is also insensitive for linear displacement of the object to be measured, relative to the detection device, and it is insensitive for refractive index fluctuations of e.g. the air where the probe beam propagates through.

SUMMARY OF THE INVENTION

The invention pertains to a method of detecting a rotation of an object over an axis coinciding with an optical axis of a probe beam. Measurement of this degree of freedom using optical interferometry was not possible until now. The method comprises providing the probe beam comprised of two monochromatic wavelengths with circular polarizations of opposite chirality, with a fixed frequency difference for providing a heterodyne probe beam. A neutral beam splitter is provided that directs a reflected beam via a polarizer filter towards a first photodetector and that directs a transmitted beam towards a quarter wave plate attached to a rotatable object. The mirror reflects the probe beam, via the quarter wave plate, back into the neutral beam splitter, which directs the reflected beam via a second polarizer filter towards a second photodetector. The rotation is derived from a phase difference between the first and second photodetector signals. The optical input beam has two fixed offset frequencies, e.g. produced by a Zeeman laser. By a quarter wave plate the optical beam is converted into a beam with circular clockwise and counter clockwise polarizations. The neutral beam splitter may split the beam into a 50% beam directed to a reference photodetector, and into a 50% beam directed to the rotational object to be measured. On the object to be measured a quarter wave plate and a mirror are attached, arranged to reflect the 50% beam back via the said quarter wave plate.

Depending on the rotation of the object to be measured, the quarter wave plate will change the phase of the probing beam, more specifically, the phase of the constituting base frequencies of the probe beam relative to the reference beam. Rotation of the targeted quarter wave plate causes a negative or positive phase shift depending on the direction of quarter wave plate rotation.

This leads to a relative change in the phase between the two detected periodic signals.

As both monochrome frequencies of the probe beam have common optical pathways, the measurement of rotation is not affected by linear displacement of the object, nor due to effects such as e.g. turbulence or temperature differences such as found when propagating through e.g. non-solid media.

The mirror behind the quarter wave plate may be attached to the rotating object or it can be placed static. Movement of this mirror does not affect the rotation measurement of the object, as both monochromatic probe frequencies are affected equally upon mirror movement.

The quarter wave plate attached to the object is the only component that is able to induce via rotation a phase offset between the two monochromatic probe frequencies. Any translation of the quarter wave plate itself, in any direction, does not affect the rotational measurement.

BRIEF DESCRIPTION OF THE DRAWINGS

FIG. 1 shows a schematic setup of the optical arrangement for carrying out the inventive method.

DETAILED DESCRIPTION OF EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the size and relative sizes of systems, components, layers, and regions may be exaggerated for clarity. Embodiments are described with reference to schematic illustrations of possibly idealized and/or intermediate structures of the invention.

Turning now to FIG. 1 an exemplary setup is depicted for carrying out the method as presently disclosed. Although the laser could be a Zeeman laser, i.e. a laser operating using the Zeeman splitting line effect, other type of beam generators may be utilized as long as the probing beam consists of two constant frequencies having a fixed frequency offset and opposite circular polarizations; this is key to correct operation of the described concept. The measurement method works with any circularly polarized heterodyne coaxial beam, Thus: the source may also consist of a 'normal' laser, whose beam is split and guided toward two acousto-optic modulators, whose outputs are combined into a coaxial heterodyne beam. The shown (commercial) Zeeman laser L, has two output frequencies whose frequency difference is controlled by a magnetic field. Due to the use of a reference detector, the frequency difference is allowed to fluctuate, it does not necessarily require to be a 'fixed' offset frequency. Of this specific laser model the output frequencies consist of two orthogonal linearly polarized frequencies. Passing these through quarter wave plate Q1 results in right and left handed chiral polarizations. This laser beam is directed to a neutral beam splitter NBS, which is a known optic described in e.g. U.S. Pat. No. 2,815,695. This optic is capable of preserving polarities and transmits and reflects a constant fraction, of e.g. 50%. The probe beam is comprised of two monochromatic wavelengths, with a frequency difference for providing a heterodyne probe beam and with mutually circular polarizations of opposite chirality. The neutral beam splitter NBS directs a reflected portion of the laser beam via a polarizer filter P1 towards a first photodetector D1. The polarizer filter filters a common single polarization state of both rotating polarities, whose interference yields a periodic signal having a frequency equal to the frequency difference between the two monochromatic base frequencies. A transmitted portion of the laser beam is directed as a probe beam B towards an object O of which a rotation is to be measured over an axis A coinciding with the optical axis of the laser probe beam B.

The object O has a quarter wave plate Q2 attached to it, that rotates along with the object O. In addition, the probe beam is reflected back by a mirror, that may also be in contact with the rotating object (this is not essential). The transmitted beam is directed towards a quarter wave plate attached, via a mirror to a rotatable body. The mirror M, which may consist of a 'plane mirror' or a 'retro-reflector', reflects the probe beam B, via the same quarter wave plate Q2, back into the neutral beam splitter NBS. The NBS directs the reflected beam via a second polarizer filter P2 towards a second photodetector D2. The second detector also receives a periodic signal whose phase is shifted positive or negative with respect to the first photodetector signal, depending on the direction of rotation of Q2. If Q2 is at standstill, the relative phase difference is zero. The rotation of the object i.e. Q2, is thus derived from the relative phase difference between the first and second photodetector signals. That is, fluctuations in the frequency difference do not affect measurement performance as object rotation comes forth from the phase difference between a reference detector and measurement detector, which both are affected equally by the initial frequency offset of the probing beam.

In preceding embodiment the discussion is limited to the functional elements, i.e. most of the powered optics used for imaging has been left out. Practical embodiments may therefore be enhanced by functional features represented by optical elements that have the same functional effects.

The invention claimed is:

1. A method of detecting rotation of a rotatable object over an axis coinciding with an optical axis of a probe beam, the method comprising:
   providing the probe beam comprised of at least a first monochromatic wavelength and a second monochromatic wavelength, wherein the first and second monochromatic wavelengths have a fixed frequency difference and a circular polarization of respective opposite chirality;
   providing a neutral beam splitter, where the probe beam is split in a section that is transmitted and a section that is reflected, the neutral beam splitter directing the reflected beam section via a polarizer filter towards a first photodetector to generate a reference signal;
   directing the transmitted beam section of the probe beam via a quarter wave plate attached to the rotatable object, wherein a mirror is arranged to reflect the transmitted beam section of the probe beam, via the quarter wave plate, back to the neutral beam splitter,
   wherein the neutral beam splitter directs the reflected transmitted beam section, via a polarizer filter toward a second photodetector to generate a periodic measurement signal, and
   wherein an object rotation is derived from a relative phase difference between the reference signal and the periodic measurement signal from the first photodetector and the second photodetector, respectively.

2. The method according to claim 1 wherein the fixed frequency difference provides a heterodyne probe beam with counter rotating circular polarizations.

3. The method according to claim 1 wherein the first monochromatic wavelength and the second monochromatic wavelength of the probe beam are provided coaxially, so that a measurement accuracy of the object rotation is not affected by a displacement of the object or effects encountered upon propagating the probe beam through non-solid media.

4. The method according to claim 2, wherein the probe beam comprises mutually circular polarizations of opposite chirality and different frequency that are transmitted through a quarter wave plate.

5. The method according to claim 1, wherein the probe beam is provided by a Zeeman laser (L).

6. The method according to claim 1, wherein the mirror is a flat mirror.

7. The method according to claim 1, wherein the mirror is a retro-reflector.

8. The method according to claim 1, wherein the mirror is a cube corner reflector.

* * * * *